(12) United States Patent
Ishii et al.

(10) Patent No.: US 8,719,883 B2
(45) Date of Patent: May 6, 2014

(54) STREAM TRANSMISSION SERVER AND STREAM TRANSMISSION SYSTEM

(75) Inventors: Hidenori Ishii, Tokyo (JP); Daisaku Komiya, Tokyo (JP)

(73) Assignee: Panasonic Corporation, Osaka (JP)

( * ) Notice: Subject to any disclaimer, the term of this patent is extended or adjusted under 35 U.S.C. 154(b) by 674 days.

(21) Appl. No.: 12/664,923

(22) PCT Filed: Jun. 27, 2008

(86) PCT No.: PCT/JP2008/001684
§ 371 (c)(1),
(2), (4) Date: Dec. 16, 2009

(87) PCT Pub. No.: WO2009/004778
PCT Pub. Date: Jan. 8, 2009

(65) Prior Publication Data
US 2010/0185748 A1 Jul. 22, 2010

(30) Foreign Application Priority Data

Jul. 2, 2007 (JP) .................................. 2007-173901

(51) Int. Cl.
*H04N 7/173* (2011.01)
*H04N 21/234* (2011.01)
*H04N 21/236* (2011.01)
*H04N 7/26* (2006.01)

(52) U.S. Cl.
CPC ........... *H04N 21/234* (2013.01); *H04N 21/236* (2013.01); *H04N 19/00927* (2013.01)
USPC ............. 725/93; 725/114; 725/131; 725/139; 725/144; 725/151

(58) Field of Classification Search
CPC .............. H04N 21/234; H04N 21/236; H04N 19/00927

USPC ......... 725/133, 141, 153, 86, 91, 93, 94, 114, 725/131, 138, 139, 144, 151; 375/240, 375/240.01, 240.12
See application file for complete search history.

(56) References Cited

U.S. PATENT DOCUMENTS

| 5,543,853 | A | * | 8/1996 | Haskell et al. | ........... 375/240.28 |
|---|---|---|---|---|---|
| 2004/0255328 | A1 | * | 12/2004 | Baldwin et al. | ................. 725/90 |
| 2005/0097614 | A1 | * | 5/2005 | Pedlow et al. | .................. 725/90 |
| 2007/0067808 | A1 | * | 3/2007 | DaCosta | ......................... 725/62 |
| 2007/0094689 | A1 | * | 4/2007 | McElhatten et al. | ............ 725/58 |

FOREIGN PATENT DOCUMENTS

| JP | 2002-368846 A | 12/2002 |
|---|---|---|
| JP | 2007-228573 A | 9/2007 |
| WO | 2006/100843 A1 | 9/2006 |

OTHER PUBLICATIONS

International Search Report for PCT/JP2008/001684.

* cited by examiner

*Primary Examiner* — Farzana Hossain
(74) *Attorney, Agent, or Firm* — Pearne & Gordon LLP

(57) ABSTRACT

A server (101) streams data coded by inter-frame prediction. The server (101) comprises: a transmission data generator (116) for causing an independently decodable key frame to be added with at least one difference frame following the key frame to create data of one transmission unit, and generating a buffering key frame added with information on the data of one transmission unit, the information including a frame number; and an output unit (114) for transmitting, with transmission timing of the key frame, a buffering key frame generated with a key frame that should be transmitted with the transmission timing, and transmitting an arbitrary frame with transmission timing of the difference frame. This can reduce buffering time for switching a terminal to play a stream between a plurality of terminals, allowing the switching to be done smoothly.

10 Claims, 9 Drawing Sheets

STREAM TRANSMISSION SERVER AND STREAM TRANSMISSION SYSTEM

RELATED APPLICATIONS

This application claims the benefit of Japanese Patent Application No. 2007-173901 filed on Jul. 2, 2007 in Japan, the contents of which are incorporated herein by reference.

TECHNICAL FIELD

The present invention relates to a streaming method, and particularly to a method of switching a terminal to play stream data from a terminal that is receiving the stream data to another terminal.

BACKGROUND ART

Technological developments have allowed computer networks to be faster and less costly, and accordingly video transmission over a network is becoming widespread. Terminals for receiving video transmission also has further diversified, and electrical home appliances equipped with Internet access functions, namely televisions and DVRs (digital video recorders), have been developed in addition to mobile phones and personal computers. From now on, electrical home appliances are likely to receive, display, and record video stream data transmitted over the Internet.

The above environment where the diversified devices can severally display video images received through a network allows video images to be displayed by a device suitable for a user situation, and can enlarge opportunities for a user to be able to view video images. For example, suppose that a user is watching a video content program over the Internet with a television set in a room. When the user goes out and if the user switches the device that displays the video content program to a mobile phone, the user can enjoy the rest of the program also outdoors.

In this example where the display device is switched between a television set and a mobile phone, the receiving session of the video content program that the television set has been receiving is switched to the mobile phone. Such switching of a session between a plurality of different devices is called session mobility. While the above is an example of session mobility in video transmission, session mobility can also be applied to a session for transmitting audio or other data.

Properties required for session mobility include two characteristics, (a) speed and (b) continuity.

Speed refers to switching the display device as fast as possible. Speed is expressed by the length of time from when a user instructs to switch to when an application that uses the session operates in the switching destination device. In video transmission, for example, speed is expressed by the time from a switch instruction to when the video image is displayed on the switching destination device.

Continuity refers to the continuation of contents before and after switching. That is, when a device to display a video content program is switched to another device in the middle of the video content program, the switching destination device is required to display the continuation of the scene that the switching source device was displaying at the time of the switch instruction.

Japanese Patent Laid-Open Application No. 2002-368846 discloses, as a scheme to realize session mobility, a procedure for outputting contents accumulated in a mobile terminal to an external device via short-range wireless communication. Specifically, the mobile terminal searches for an external device, establishes connection with the found external device, and transfers the contents.

DISCLOSURE OF THE INVENTION

Problems to be Solved by the Invention

In streaming, a packet is regularly outputted from a source. A phenomenon called "jitter," in which intervals between arrivals of the regularly outputted packets vary, generally occurs in packet communication over a network. Reproduction of received stream data continuously requires moving image data and audio data, but the occurrence of jitter would break the reproduction. In order to prevent this in streaming, a buffering process in which received data is stored in a buffer is performed before starting the reproduction of data. The buffering process is also performed at the time of switching the terminal. For this reason, a time would be required before starting reproduction of data when downloading of stream data is started and when a terminal to play stream data is switched.

The above-mentioned Japanese Patent Laid-Open Application No. 2002-368846 suggests a method in which the time required to search for an external device is reduced by searching for an external device before a user performs a start operation, but has not considered the time required for buffering at all.

A purpose of the invention made in view of the above-mentioned background is to provide a streaming method in which an initial buffering time at the time of switching a terminal is reduced and a terminal to play data can be smoothly switched.

Means for solving the problems

A streaming server of the invention is a server for streaming data coded by inter-frame prediction, and the streaming server comprises: a buffering-key-frame generator for causing an independently decodable key frame to be added with at least one difference frame following the key frame to create data of one transmission unit, and generating a buffering key frame added with information on the data of one transmission unit, the information including a frame number; and a frame transmitter for transmitting, with transmission timing of the key frame set in advance to a determined period, a buffering key frame generated with a key frame that should be transmitted with the transmission timing, and transmitting an arbitrary frame with transmission timing of the difference frame provided during the interval of the transmission timing of the key frame.

A streaming server of another aspect of the invention is a server for streaming data composed of moving image data and audio data coded by inter-frame prediction, and the streaming server comprises: a buffering-key-frame generator for causing an independently decodable key frame of moving image data to be added with an audio frame corresponding to the key frame and at least one audio frame following the audio frame concerned to create data of one transmission unit, and generating a buffering key frame added with information on the data of one transmission unit, the information including a frame number; and a frame transmitter for transmitting, with transmission timing of the key frame set in advance to a determined period, a buffering key frame generated with a key frame that should be transmitted with the transmission timing, and transmitting, with transmission timing of a difference frame provided during the interval of the transmission timing of the key frame, a difference frame that should be transmitted with the transmission timing concerned and an arbitrary audio frame.

A streaming system of the invention comprises: a streaming server for streaming data coded by inter-frame prediction; a first terminal for reproducing stream data transmitted from the streaming server; and a second terminal for receiving stream data transferred from the first terminal and reproducing the stream data, where the streaming server comprises: a buffering-key-frame generator for causing an independently decodable key frame to be added with at least one difference frame following the key frame to create data of one transmission unit, and generating a buffering key frame added with information on the data of one transmission unit, the information including a frame number; and a frame transmitter for transmitting, with transmission timing of the key frame set in advance to a determined period, a buffering key frame generated with a key frame that should be transmitted with the transmission timing, and transmitting an arbitrary frame with transmission timing of the difference frame provided during the interval of the transmission timing of the key frame, where the first terminal comprises: a frame receiver for receiving a buffering key frame and difference frame transmitted from the streaming server; a buffer for storing a received frame; a playback means for reading a frame stored in the buffer and reproducing stream data; a reproduced-frame-number storage for storing a frame number for an already reproduced frame; and a deletion unit for, if a frame number for a frame read from the buffer matches a frame number stored in the reproduced-frame-number storage, deleting the frame without reproducing the frame, and where when a switch request is received, the first terminal reads, from data stored in the buffer, data stored in the buffer headed by a buffering key frame reproduced immediately before the reception of the switch request, and transmits the read data to the second terminal.

A streaming method of the invention comprises the steps of: a streaming server for streaming data coded by inter-frame prediction, causing an independently decodable key frame to be added with at least one difference frame following the key frame to create data of one transmission unit, and generating a buffering key frame added with information on the data of one transmission unit, the information including a frame number; transmitting, with transmission timing of the key frame set in advance to a determined period, a buffering key frame generated with a key frame that should be transmitted with the transmission timing, and transmitting an arbitrary frame with transmission timing of the difference frame provided during the interval of the transmission timing of the key frame.

There are other aspects of the invention as described below. This disclosure of the invention therefore intends to provide part of the aspects of the invention and does not intend to limit the scope of the invention described and claimed herein.

BEST MODE OF EMBODYING THE INVENTION

Figure 1:
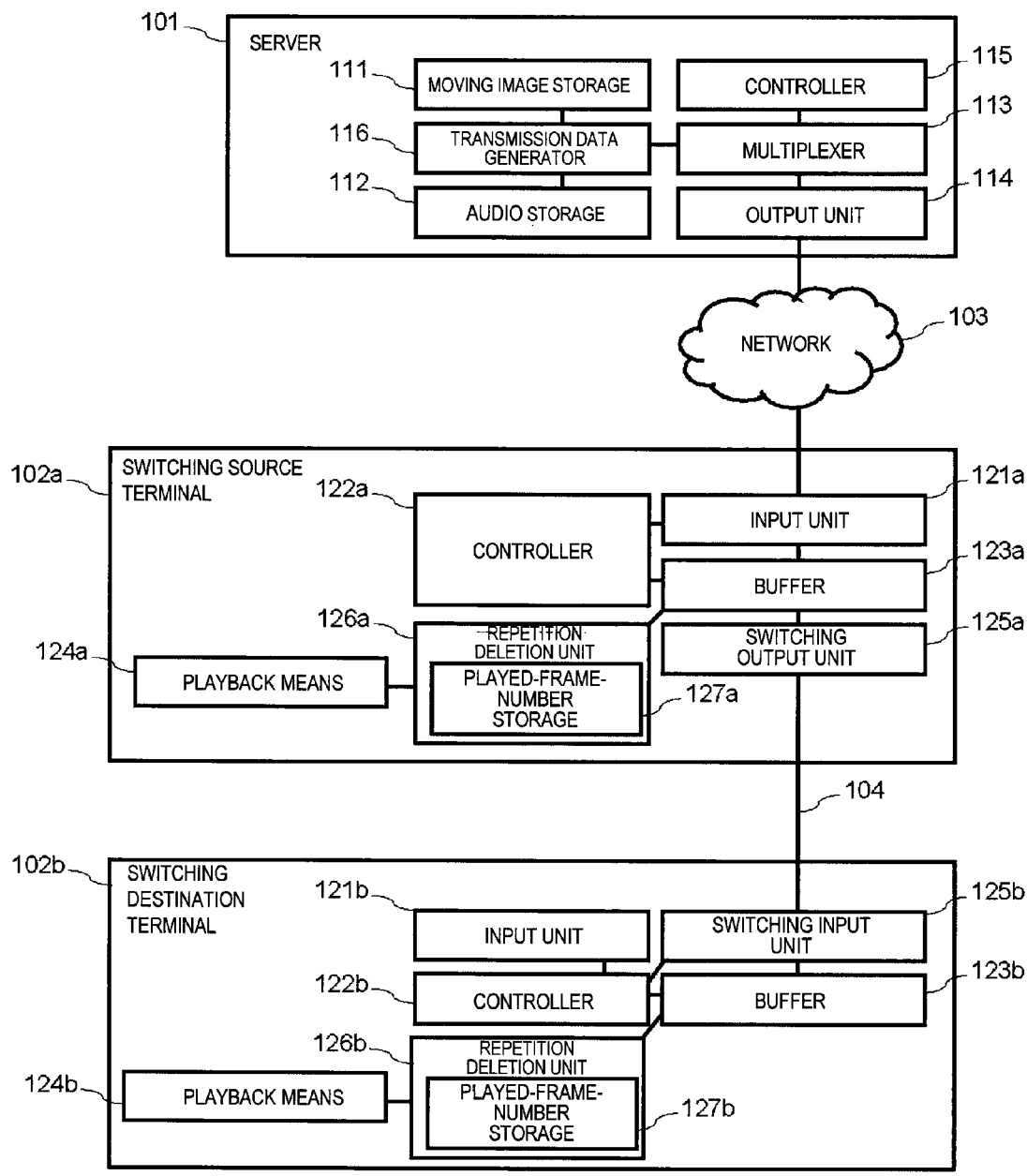
FIG. 1 is a block configuration diagram of a system of a first embodiment.

The following is a detailed description of the invention. It will be understood that the embodiments described below are only examples of the invention, and the invention can be varied in various aspects. Therefore, the specific configurations and functions disclosed below do not limit the claims.

A streaming server of an embodiment is a server for streaming data coded by inter-frame prediction, and the streaming server comprises: a buffering-key-frame generator for causing an independently decodable key frame to be added with at least one difference frame following the key frame to create data of one transmission unit, and generating a buffering key frame added with information on the data of one transmission unit, the information including a frame number; and a frame transmitter for transmitting, with transmission timing of the key frame set in advance to a determined period, a buffering key frame generated with a key frame that should be transmitted with the transmission timing, and transmitting an arbitrary frame with transmission timing of the difference frame provided during the interval of the transmission timing of the key frame.

Time required for buffering can be reduced by transmitting as above a key frame with the addition of a difference frame following the key frame as data of one transmission unit with the transmission timing of the key frame. That is, generally only a key frame can be buffered with the transmission timing of the key frame but, in the embodiment, a key frame and a difference frame following the key frame can be buffered. In addition, since the process is performed in which a difference frame is added to a key frame that appears with a determined period, even if a terminal that has received stream data is to transfer the stream data from the middle thereof to another terminal, the time required for the other terminal to buffer can be reduced.

In the streaming server of the embodiment, the frame transmitter may transmit, with the transmission timing of the difference frame, a difference frame not yet transmitted out of difference frames between key frames preceding and following the difference frame concerned, and may transmit an arbitrary frame if all difference frames between the preceding and following key frames have been transmitted.

Transmitting a not yet transmitted difference frame between the preceding and following key frames as above allows a terminal receiving the stream data to appropriately play the stream data. If all difference frames between the preceding and following key frames have been transmitted, an arbitrary frame is transmitted to keep the number of difference frames between key frames constant, and this allows the receiving terminal to recognize the ordinal position of a frame based on information on what position in the order the frame was received in. As a result, the receiving terminal can identify a buffering key frame based on the position of the frame in the order of reception even without decoding the received data. The arbitrary frame may be a key frame or a difference frame. The frame transmitter may transmit an already transmitted frame again as the arbitrary frame.

A streaming server of another aspect of the embodiment is a server for streaming data composed of moving image data and audio data coded by inter-frame prediction, and the streaming server comprises: a buffering-key-frame generator for causing an independently decodable key frame of moving image data to be added with an audio frame corresponding to the key frame and at least one audio frame following the audio frame concerned to create data of one transmission unit, and generating a buffering key frame added with information on the data of one transmission unit, the information including a frame number; and a frame transmitter for transmitting, with transmission timing of the key frame set in advance to a determined period, a buffering key frame generated with a key frame that should be transmitted with the transmission timing, and transmitting, with transmission timing of a difference frame provided during the interval of the transmission timing of the key frame, a difference frame that should be transmitted with the transmission timing concerned and an arbitrary audio frame.

Time required for buffering audio frames can be reduced by transmitting as above a key frame and an audio frame corresponding to the key frame with the addition of an audio frame following the audio frame as data of one transmission unit with the transmission timing of the key frame of moving image data. In addition, since the process is performed in which an audio frame is added to a key frame that appears with a determined period, even if a terminal that has received stream data is to transfer the stream data from the middle thereof to another terminal, the time required for the other terminal to buffer audio frames can be reduced.

A terminal of the embodiment is a terminal for reproducing stream data transmitted from the above-described streaming server, and the terminal comprises: a frame receiver for receiving a buffering key frame and difference frame transmitted from the streaming server; a buffer for storing a received frame; a playback means for reading a frame stored in the buffer and reproducing stream data; a played-frame-number storage for storing a frame number for an already played frame; and a deletion unit for, if a frame number for a frame read from the buffer matches a frame number stored in the played-frame-number storage, deleting the frame without reproducing the frame.

In this configuration, if an already played frame is read from the buffer, the frame is deleted without being played. Therefore, the same frame is not repeatedly played, and the stream data can be appropriately played.

The terminal of the embodiment may have a switch request receiver for receiving a switch request for switching a terminal that plays stream data to another terminal, where when the switch request is received, a controller may read, from data stored in the buffer, data stored in the buffer headed by a buffering key frame played immediately before the reception of the switch request, and may transmit the read data to the other terminal.

As described above, stream data headed by a buffering key frame played immediately before the reception of a switch request is transmitted to another terminal of a switching destination, and this can reduce the time required for the other terminal to buffer. As a result, the terminal to play stream data can be switched quickly.

A streaming system of the embodiment comprises: a streaming server for streaming data coded by inter-frame prediction; a first terminal for reproducing stream data transmitted from the streaming server; and a second terminal for receiving stream data transferred from the first terminal and reproducing the stream data, where the streaming server comprises: a buffering-key-frame generator for causing an independently decodable key frame to be added with at least one difference frame following the key frame to create data of one transmission unit, and generating a buffering key frame added with information on the data of one transmission unit, the information including a frame number; and a frame transmitter for transmitting, with transmission timing of the key frame set in advance to a determined period, a buffering key frame generated with a key frame that should be transmitted with the transmission timing, and transmitting an arbitrary frame with transmission timing of the difference frame provided during the interval of the transmission timing of the key frame, where the first terminal comprises: a frame receiver for receiving a buffering key frame and difference frame transmitted from the streaming server; a buffer for storing a received frame; a playback means for reading a frame stored in the buffer and reproducing stream data; a played-frame-number storage for storing a frame number for an already played frame; and a deletion unit for, if a frame number for a frame read from the buffer matches a frame number stored in the played-frame-number storage, deleting the frame without reproducing the frame, and where when a switch request is received, the first terminal reads, from data stored in the buffer, data stored in the buffer headed by a buffering key frame played immediately before the reception of the switch request, and transmits the read data to the second terminal.

As in the case of the above-described embodiment of the streaming server, this configuration can reduce the time required for the first and second terminals to buffer stream data.

A streaming method of the embodiment comprises the steps of: a streaming server for streaming data coded by inter-frame prediction, causing an independently decodable key frame to be added with at least one difference frame following the key frame to create data of one transmission unit, and generating a buffering key frame added with information on the data of one transmission unit, the information including a frame number; transmitting, with transmission timing of the key frame set in advance to a determined period, a buffering key frame generated with a key frame that should be transmitted with the transmission timing; and transmitting an arbitrary frame with transmission timing of the difference frame provided during the interval of the transmission timing of the key frame.

As in the case of the above-described embodiment of the streaming server, this configuration can reduce the time required for a terminal that receives stream data to buffer the stream data. Even if a terminal that has received stream data is to transfer the stream data from the middle thereof to another terminal, the time required for the other terminal to buffer can be reduced.

The streaming method of the embodiment may have the steps of: the streaming server receiving data on the number of difference frames to be added to the key frame, the data calculated based on jitter by a terminal that receives stream data, from the terminal; and increasing or decreasing the number of difference frames to be included in a buffering key frame in accordance with the data on the number of difference frames.

This configuration can achieve optimum streaming control in response to changes in the status of communications between the streaming server and the terminal.

The streaming method of the embodiment may have the steps of: receiving a buffering key frame and difference frame transmitted from the streaming server; storing a received buffering key frame and difference frame in a buffer; reading a frame stored in the buffer and reproducing stream data; storing a frame number for an already played frame in a played-frame-number storage; and if a frame number for a frame read from the buffer matches a frame number stored in the played-frame-number storage, deleting the frame without reproducing the frame.

In this configuration, if an already played frame is read from the buffer, the frame is deleted without being played. Therefore, the same frame is not repeatedly played, and the stream data can be appropriately played.

The streaming method of the embodiment may have the steps of: receiving a switch request for switching a terminal that plays stream data to another terminal; and when the switch request is received, reading, from data stored in the buffer, data stored in the buffer headed by a buffering key frame played immediately before the reception of the switch request, and transmitting the read data to the other terminal.

In this configuration, the time required for the other terminal to buffer can be reduced, and the terminal to play stream data can be switched quickly.

The streaming method of the embodiment may have the steps of: detecting the magnitude of jitter in data transmitted from the streaming server; calculating based on the jitter the number of difference frames to be added to the key frame; and transmitting data on the number of the difference frames to the streaming server.

This configuration can achieve optimum streaming control in response to changes in the status of communications between the streaming server and the terminal.

Now, streaming systems of embodiments of the invention will be described in detail with reference to the drawings.

First Embodiment

FIG. 1 shows a configuration of a streaming system of a first embodiment. As shown in FIG. 1, the streaming system has a server 101, a switching source terminal 102a, and a switching destination terminal 102b.

The server 101 transmits stream data by regularly transmitting frames. Frames comprising stream data are composed of a moving image frame and an audio frame. The embodiment uses a codec that compresses each moving image frame and audio frame. Such a codec includes, for example, MPEG-2 or MPEG-4 (including H.264) for moving images, and MPEG-2/MPEG-4 AAC (Advanced Audio Coding) and MP3 (MPEG-1 Audio Layer-3) for audio. In a codec that uses inter-frame prediction, types of a picture in a case where a picture is handled in frame include an independent frame (I frame) generated only by intra-frame compression and a difference frame (P frame or B frame) generated by inter-frame compression. A difference frame uses a difference with an independent frame to express information on a frame, and cannot be played without the independent frame. For this reason, starting reproduction of moving image data requires to start the reproduction with an independent frame. An I frame is hereinafter referred to as an independent frame, and a P or B frame is hereinafter referred to as a difference frame. An independent frame is transmitted with a determined period. The transmission period for an independent frame is defined by a standard for example, and generally corresponds to one out of every 15 frames.

The server 101 has a moving image storage 111, an audio storage 112, a multiplexer 113, an output unit 114, a controller 115, and a transmission data generator 116. The moving image storage 111 accumulates moving image data transmitted by the server 101. The audio storage 112 accumulates audio data transmitted by the server 101. The moving image storage 111 and the audio storage 112 are each comprised of a storage device, for example.

The transmission data generator 116 reads moving image data stored in the moving image storage 111 and audio data stored in the audio storage 112 to generate transmission data. With transmission timing of an independent frame, the transmission data generator 116 reads an independent frame that should be transmitted with the transmission timing and, for example, two difference frames following the independent frame, and generates transmission data. The independent frame added with, for example, two difference frames corresponds to a "buffering key frame." With transmission timing of a difference frame other than an independent frame, the transmission data generator 116 reads a frame following the frame read at the previous time to generate transmission data.

The multiplexer 113 multiplexes the transmission data generated by the transmission data generator 116 to generate a multiplexed stream. The output unit 114 outputs the multiplexed stream generated by the multiplexer 113 to the switching source terminal 102a. The controller 115 controls the operation of the server 101.

The switching source terminal 102a has an input unit 121a, a controller 122a, a buffer 123a, a playback means 124a, a switching output unit 125a, and a repetition deletion unit 126a. The input unit 121a receives a control signal, moving image data, audio data, and the like transmitted from the server 101. The input unit 121a corresponds to a network protocol stack, such as TCP/IP. The controller 122a performs communication-related terminal control, such as call control for another terminal and transmission rate change. The controller 122a corresponds to application software.

The buffer 123a temporarily stores moving image data and audio data received by the input unit 121a. The buffer 123a comprises, for example, a memory. The playback means 124a reads data stored in the buffer 123a and plays the read data. The playback means 124a comprises, for example, a memory for a display, a decoder for moving image data and audio data, a display program for moving images, hardware for graphical display and audio reproduction, a display, and a speaker.

The switching output unit 125a establishes connection with the switching destination terminal 102b. The switching output unit 125a is implemented as a protocol stack, as in the case of the input unit 121a. The input unit 121a and the switching output unit 125a connect with destinations of addresses different from each other. The controller 122a can distinguish between the input unit 121a and the switching output unit 125a by a difference in settings.

The repetition deletion unit 126a has a function to delete already played moving image data and audio data read from the buffer 123a, in order not to repeatedly play them. The repetition deletion unit 126a has a played-frame-number storage 127a, and stores the frame number for an already played moving image frame and audio frame. When a moving image frame and an audio frame are read from the buffer 123a, the repetition deletion unit 126a determines whether the frame number for the read moving image frame and audio frame is stored in the played-frame-number storage 127a or not. If the frame number for the read moving image frame and audio frame is stored in the played-frame-number storage 127a, the repetition deletion unit 126a deletes the moving image frame and audio frame read from the buffer 123a. If the frame number for the read moving image frame and audio frame is not stored in the played-frame-number storage 127a, the repetition deletion unit 126a stores the frame number for the moving image frame and audio frame read from the buffer 123a in the played-frame-number storage 127a. While the embodiment adopts a configuration in which the frame numbers are stored in the played-frame-number storage 127a when a moving image frame and an audio frame are read from the buffer 123a, a configuration can also be adopted in which the frame numbers are stored in the played-frame-number storage 127a when the reproduction has actually been completed.

The basic configuration of the switching destination terminal 102b is the same as that of the switching source terminal 102a. The switching destination terminal 102b is different from the switching source terminal 102a in that the switching destination terminal 102b does not have the switching output unit 125a but has a switching input unit 125b. The switching input unit 125b receives stream data outputted from the switching source terminal 102a when the terminal is switched. The switching destination terminal 102b stores the input from the switching input unit 125b in a buffer 123b as with the input from the server 101, and plays the data stored in the buffer 123b by means of a playback means 124b.

Figure 2:
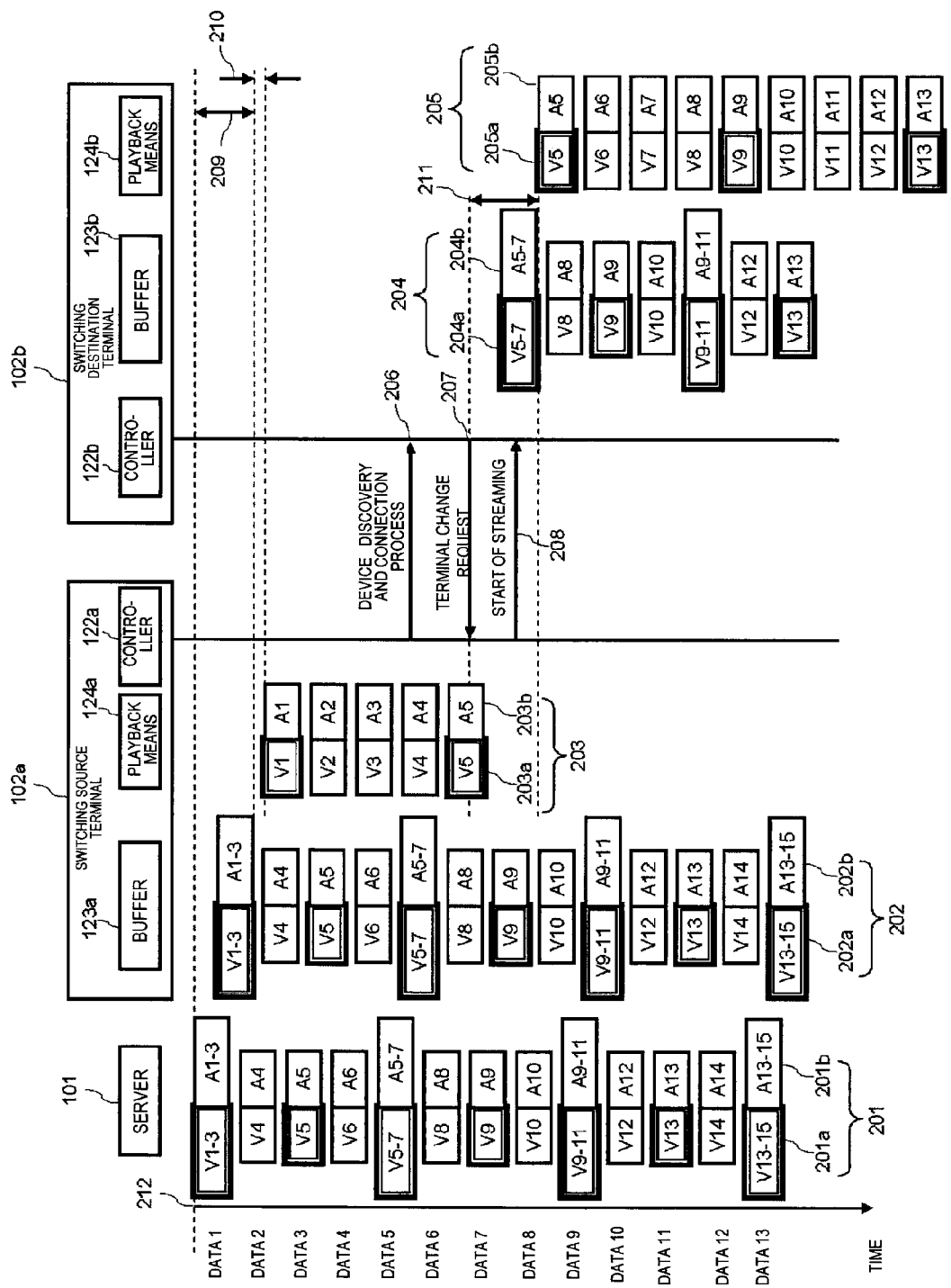
FIG. 2 is a transmission timing diagram of the first embodiment.

FIG. 2 shows timing of the output and reproduction of moving image data and audio data in an operation of the streaming system of the embodiment. A temporal axis 212 shows the passage of time. In FIG. 2, moving image frames and audio frames are expressed by rectangles, and numerals indicating the frame numbers are written in the rectangles. "V" (which stands for video) is given in front of the frame number for moving image data, and "A" (which stands for audio) is given in front of the frame number for audio data. For example, a frame of frame number 4 is expressed as "V4" or "A4," and a set of frames of frame numbers 1 to 3 is expressed as "V1-3" or "A1-3."

In the embodiment, the time required for reproducing a moving image frame is the same as that for reproducing an audio frame. As long as moving image data and audio data correspond to each other and are to be in sync with each other at the time of reproduction, a moving image frame and an audio frame may be different in length from each other. In that case, handling moving image data and audio data that should be simultaneously played as a set provides the same advantage as the embodiment.

As described before, an independent frame generally appears in one out of every 15 frames. In FIG. 2, however, an example is described in which it appears in one out of every four frames for the sake of simplicity. In FIG. 2, "V1," "V5," "V9," and "V13" are independent frames, which are shown in boxes with bold outlines. In the embodiment, a key frame collectively refers to a frame that, as an independent frame does for a moving image, plays an important role in a process at a transmission destination when streaming is performed.

In FIG. 2, moving image data 201a and audio data 201b show timing with which each frame is outputted. In the embodiment, the moving image data 201a and the audio data 201b are collectively referred to as a multiplexed stream 201.

In FIG. 2, moving image data 202a and audio data 202b show timing with which the switching source terminal 102a stores in the buffer 123a each frame of moving image data and audio data received from the server 101. In the embodiment, the moving image data 202a and the audio data 202b are collectively referred to as a multiplexed stream 202.

In FIG. 2, moving image data 203a and audio data 203b show timing with which the switching source terminal 102a plays each frame of moving image data and audio data. In the embodiment, the moving image data 203a and the audio data 203b are collectively referred to as a multiplexed stream 203.

In FIG. 2, moving image data 204a and audio data 204b show timing with which the switching destination terminal 102b stores in the buffer 123b each frame of moving image data and audio data received from the switching source terminal 102a. In the embodiment, the moving image data 204a and the audio data 204b are collectively referred to as a multiplexed stream 204.

In FIG. 2, moving image data 205a and audio data 205b show timing with which the switching destination terminal 102b plays each frame of moving image data and audio data received from the switching source terminal 102a. In the embodiment, the moving image data 205a and the audio data 205b are collectively referred to as a multiplexed stream 205.

A flow of a multiplexed stream in the streaming system of the embodiment will now be described with reference to FIG. 2.

An operation of the server 101 in the embodiment will be described first. The server 101 outputs the multiplexed stream 201, in which a moving image frame and an audio frame are multiplexed, at fixed time intervals. When transmitting an independent frame, the server 101 generates the multiplexed stream by adding a determined number of moving image frames and audio frames for use in buffering to independent frames of moving image data and audio data. Timing with which an independent frame is to be transmitted is detected according to whether a frame number k indicating the position of a frame in the order of transmission matches the number for the independent frame or not. Provided that the interval between independent frames is n (pieces), the numbers for independent frames are 1, 1+n, 1+2n, . . . , and so forth. The controller 115 therefore determines whether the frame number k satisfies $k=1+m\times n$ (m is an integer equal to or greater than zero) or not, and determines that the frame is an independent frame if the frame number k satisfies the above equation. When transmitting an independent frame, the server 101 generates the multiplexed stream 201 by adding b pieces of moving image frames and b pieces of audio frames for use in buffering, and outputs the multiplexed stream 201.

In the example shown in FIG. 2, the number of frames used for buffering, b, is 2. For example, when outputting a frame of frame number 1 as the multiplexed stream 201, the server 101 outputs independent frames, namely a moving image frame V1 and an audio frame A1 whose frame number is 1, with the addition of two moving image frames V2 and V3 and two audio frames A2 and A3 for use in buffering. As a result, the moving image frames V2 and V3 and the audio frames A2 and A3 are outputted with earlier timing than in a case where the addition process is not performed. That is, when the addition process were not performed, the moving image frame V2 and the audio frame A2 would be transmitted with transmission timing of Data 2, and the moving image frame V3 and the audio frame A3 would be transmitted with transmission timing of Data 3. Accordingly, the moving image frames V2 and V3 and the audio frames A2 and A3 could not be transmitted until the transmission timing of Data 3. In the embodiment, by transmitting a key frame with transmission timing of Data 1 with the addition of the moving image frames V2 and V3 and the audio frames A2 and A3, the moving image frames V2 and V3 and the audio frames A2 and A3 can be transmitted with earlier timing before the transmission timing of Data 2. In FIG. 2, the process of adding moving image frames and audio frames is severally performed for the multiplexed stream outputted at the 1st, 5th, 9th, and 13th time.

Independent frames and difference frames are drawn in the same size in FIG. 2, but actually the amount of data in a difference frame is extremely smaller than that in an independent frame. Therefore, transmission delay due to the addition of a difference frame to an independent frame is smaller than the independent frame transmission interval. An independent frame can be transmitted with the addition of a difference frame before transmission of the next frame even without a change in the independent frame transmission interval.

With timing of transmitting a difference frame, the server 101 multiplexes and outputs frames following the moving image frame and audio frame that have been outputted immediately before. The frame number for the multiplexed stream 201 outputted at the kth time (k≠1+m×n) is (k+b). In the example shown in FIG. 2, the frame number for the moving image data 201a and audio data 201b transmitted with the frame transmission timing at the kth time (k≠1+m×n) is (k+2). For example, the multiplexed stream 201 outputted at the 2nd time includes moving image data V4 and audio data A4, and the multiplexed stream 201 outputted at the 3rd time includes moving image data V5 and audio data A5.

In the embodiment, when the system starts operation, the server 101 outputs the multiplexed stream 201 composed of moving image data 201a comprising moving image frames V1-3 (V1, V2, and V3; hereinafter the same shall apply) and audio data 201b comprising audio frames A1-3 (A1, A2, and A3; hereinafter the same shall apply). The process of the system for the moving image frames V1-3 and audio frames A1-3 will be described next.

On receiving the moving image frames V1-3 and the audio frames A1-3, the switching source terminal 102a stores the received moving image frames V1-3 and audio frames A1-3 in the buffer 123a. As shown in FIG. 2, the timing with which the switching source terminal 102a stores in the buffer 123a is delayed relative to the time of transmission from the server 101. This delay time 209 is the time required for network transmission and reception of the moving image frames V1-3 and audio frames A1-3 and for storing the data in the buffer 123a.

On completion of the process of storing the three frames (V1-3 and A1-3) in the buffer 123a, the switching source terminal 102a performs a reproduction process by means of the playback means 124a. Also in the embodiment as in the prior art, the reproduction is started at a time point when a determined amount of data is stored in the buffer 123a. In this example, the reproduction is started at a time point when data corresponding to three frames (V1-3 and A1-3) is stored in the buffer 123a. A delay time 210 from when the determined amount of data is stored in the buffer 123a to the reproduction is the time required for reading, decoding, and reproducing the data from the buffer 123a. Once having started the reproduction, the switching source terminal 102a successively reads and plays moving image data and audio data stored in the buffer 123a.

With the output timing at the 2nd time following the moving image frames V1-3 and audio frames A1-3, the server 101 multiplexes the moving image frame V4 and the audio frame A4 to generate and output the multiplexed stream 201. The switching source terminal 102a stores the one-frame moving image frame V4 and audio frame A4 in the buffer 123a. The server 101 outputs the multiplexed stream 201 composed of the moving image frame V5 and audio frame A5 with the output timing at the 3rd time, and outputs the multiplexed stream 201 composed of the moving image frame V6 and audio frame A6 with the output timing at the 4th time. In response to these actions, the switching source terminal 102a performs the process of storing in the buffer 123a as in the case of the multiplexed stream 201 composed of the moving image frame V4 and audio frame A4.

The server 101 outputs moving image frames V5-7 and audio frames A5-7 with the output timing at the 5th time at which the position in the order of frame output matches 1+m×4 (m is an integer equal to or greater than zero); moving image frames V9-11 and audio frames A9-11 with the output timing at the 9th time; and moving image frames V13-15 and audio frames A13-15 with the output timing at the 13th time. In response to these actions, the switching source terminal 102a performs the process of storing in the buffer 123a as in the case of the multiplexed stream 201 composed of the moving image frames V1-3 and the audio frames A1-3.

While reproducing the multiplexed stream 203, the switching source terminal 102a performs a device discovery and connection process 206. The device discovery and connection process 206 is a process in which the switching source terminal 102a detects the switching destination terminal 102b and establishes communication connection therewith. The execution of the device discovery and connection process 206 allows the switching source terminal 102a and the switching destination terminal 102b to communicate with each other. The device discovery and connection process 206 may be activated by a user operation, a timer, or other triggers.

On detection of the switching destination terminal 102b by the device discovery and connection process 206, the switching destination terminal 102b outputs a terminal change request 207 for switching the terminal that plays the multiplexed stream 201. The switching destination terminal 102b may output the terminal change request 207 after the device discovery and connection process 206. The switching destination terminal 102b may output the terminal change request 207 in response to an operation or instruction of a user, or automatically without a user operation.

In response to the terminal change request 207, the switching source terminal 102a outputs the multiplexed stream 202 including an independent frame required for reproduction to the switching destination terminal 102b. In the example shown in FIG. 2, the moving image frame V5 and the audio frame A5 are being played on the switching source terminal 102a when the terminal change request 207 is inputted to the switching source terminal 102a. So, the switching source terminal 102a transfers the stream data to the switching destination terminal 102b so that the moving image frame V6, the audio frame A6, and the subsequent data can be played.

The multiplexed stream 202 composed of the moving image frames V5-7 and audio frames A5-7 is inputted to the switching destination terminal 102b. Since the multiplexed stream 202 includes three moving image frames and three audio frames, the switching destination terminal 102b immediately completes the buffering preceding the start of data reproduction. The switching destination terminal 102b, by means of the playback means 124b, demultiplexes the multiplexed stream 202 into the moving image frames and audio frames, then decodes them, and starts reproduction. The time required from the terminal change request 207 to the start of display is a time 211.

Operations of the server 101, switching source terminal 102a, and switching destination terminal 102b will now be described in detail with reference to FIGS. 3 to 5. The operations described below are only examples for transmitting and reproducing moving image data and audio data with the timing shown in FIG. 2. The invention is not limited to the operations described below.

(Operation of the Server)

Figure 3:
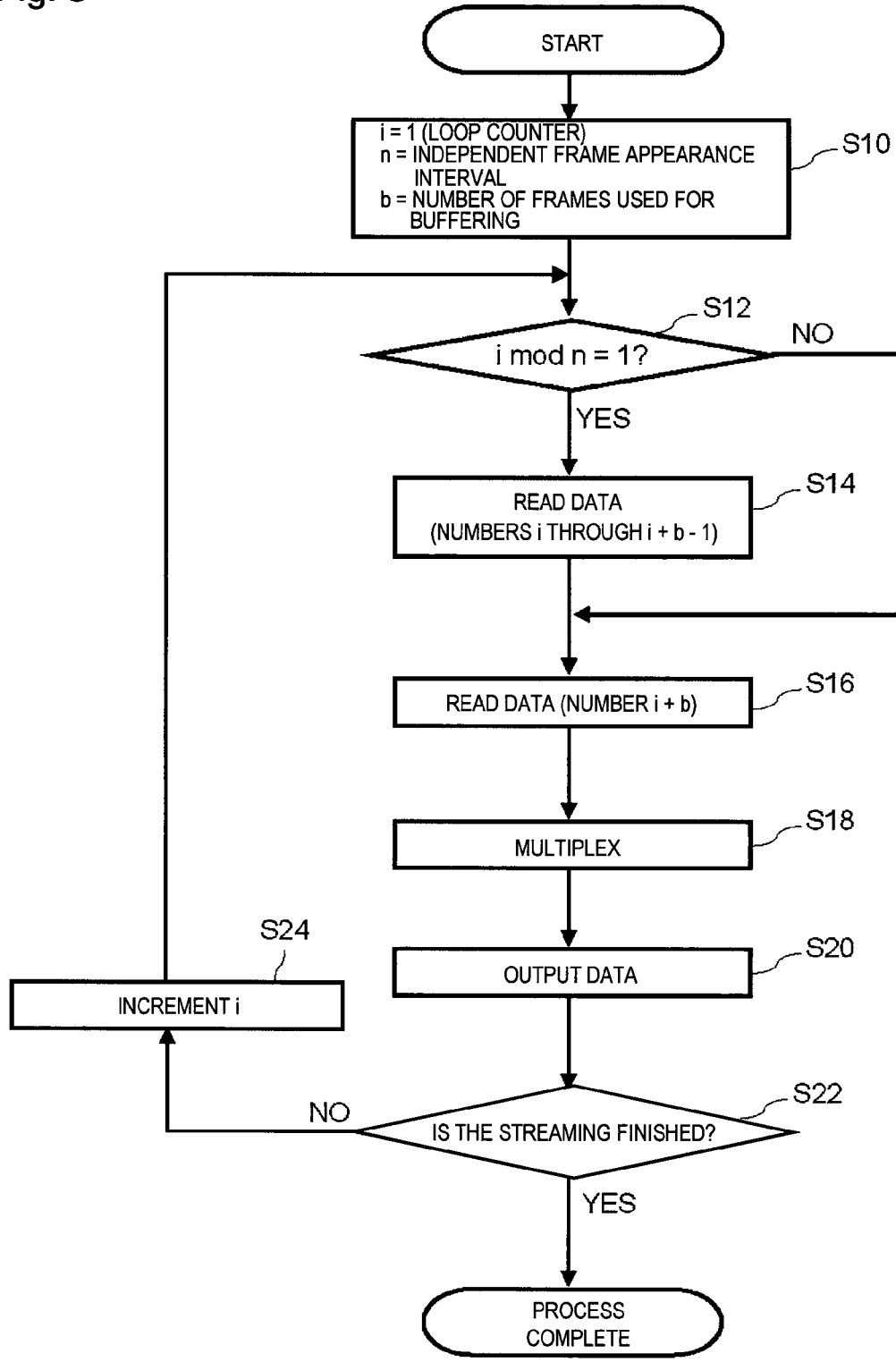
FIG. 3 is an operation flowchart of a server 101 of the first embodiment.

FIG. 3 shows an operation of the server 101. First, the server 101 performs an initialization process (S10). The controller 115 of the server 101 substitutes 1 for a loop counter i that indicates the ordinal position of the multiplexed stream 201 to be outputted.

The multiplexed stream 201 to be outputted at the ith time is denoted by Data i. The controller 115 sets the value of an independent frame appearance interval n based on a codec that it uses, and sets the number of frames used for buffering, b. They are set in the embodiment as n=4 and b=2.

The controller 115 determines whether the frame to be outputted next is an independent frame or not (S12). Specifically, the controller 115 determines whether the loop counter i leaves a remainder of 1 when divided by the independent frame appearance interval n or not. If the determination result indicates that the frame to be outputted next is in the ordinal position for an independent frame (Yes at S12), the transmission data generator 116 goes into a process for generating a buffering key frame (S14). The transmission data generator 116 reads moving image frames and audio frames of frame numbers i through i+b−1 from the moving image storage 111 and audio storage 112.

At first, since the value of the loop counter i is 1 (initial value), the frame is determined to be an independent frame (Yes at S12). The transmission data generator 116 reads moving image frames and audio frames of frame numbers 1 to 2 from the moving image storage 111 and audio storage 112.

The transmission data generator 116 then reads a moving image frame and an audio frame of frame number i+b (S16). Since i=1 and b=2 here, the transmission data generator 116 reads a moving image frame and audio frame of frame number 3. Using the moving image frames and audio frames of frame numbers 1 to 3 read as above, the transmission data generator 116 generates transmission data composed of the frames 1 to 3.

The multiplexer 113 multiplexes the moving image frames and audio frames of frame numbers 1 to 3 read by the transmission data generator 116, adds frame information for the data composed of three frames to be recognized as one transmission unit to header information, and generates the multiplexed stream (S18). The server 101 transmits the multiplexed stream from the output unit 114 (S20). Incidentally, the transmission format of the multiplexed stream comprises a header section including a destination address or the like and a data section including moving image frames and audio frames, and has in the header section an option area including the frame information. The option area in the header section may include, as the frame information on data of one transmission unit, any one of the frame number for a key frame, the frame number for a difference frame, the frame type (P/B picture), the size, the transmission period n, and the number of additional frames b, for example. The frame information may not only be included in the option area in the header section but also be multiplexed into the multiplexed stream as a frame information section.

After transmitting the multiplexed stream, the controller 115 of the server 101 determines whether the streaming is to be finished or not (S22). If the determination result indicates that the streaming is to be finished (Yes at S22), the controller 115 finishes the streaming process. If it is determined that the streaming is not finished (No at S22), the controller 115 increments the loop counter i (S24), and goes into the process of determining whether the frame to be outputted next is in the ordinal position for an independent frame or not (S12).

In the second loop, the loop counter i becomes 2, and therefore the loop counter, 2, leaves a remainder of 2 when divided by the independent frame appearance interval, 4, in the determination of whether the frame to be outputted is an independent frame or not (S12). The frame to be outputted is therefore determined not to be an independent frame (No at S12). Accordingly, the controller 115 goes into the process of reading data of frame number i+b (S16). Since i=2 and b=2 here, the controller 115 reads a moving image frame and audio frame of frame number 4.

The multiplexer 113 then multiplexes the moving image frame and audio frame of frame number 4 read by the controller 115 to generate the multiplexed stream (S18), and transmits the multiplexed stream from the output unit 114 (S20).

As described above, the transmission data generator 116 switches between reading an independent frame and the subsequent two difference frames and reading only a difference frame according to whether the frame is an independent frame or not, and thereby transmits the multiplexed stream 201 shown in FIG. 2.

(Operation of the Switching Source Terminal)

Figure 4:
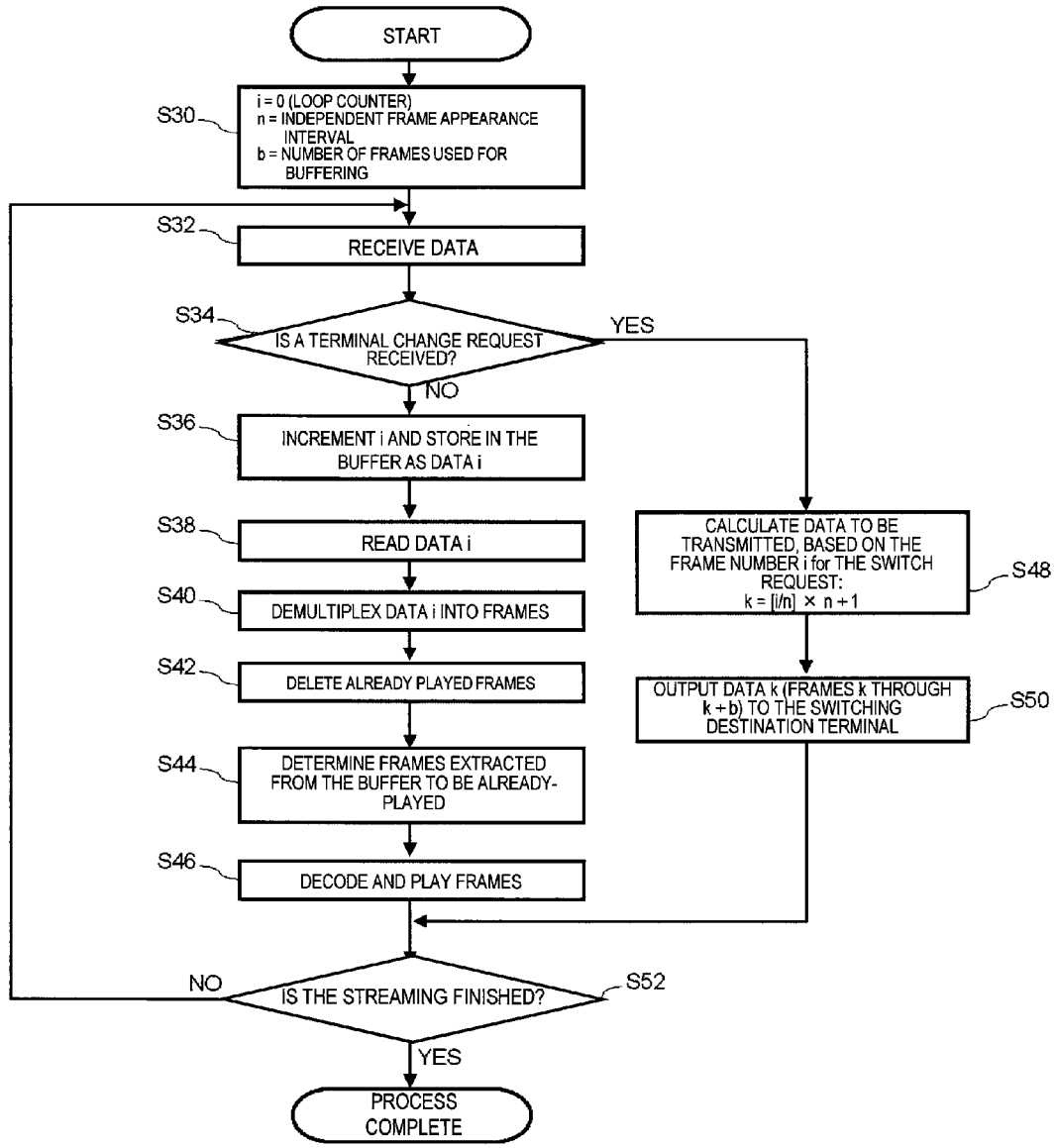
FIG. 4 is an operation flowchart of a switching source terminal 102a of the first embodiment.

FIG. 4 shows an operation of the switching source terminal 102a. First, the switching source terminal 102a performs an initialization process (S30). The controller 122a of the switching source terminal 102a substitutes 0 for a loop counter i that indicates the ordinal position of the multiplexed stream 201. The controller 122a sets the value of an independent frame appearance interval n based on a codec that it uses, and sets the number of frames used for buffering, b. They are set in the embodiment as n=4 and b=2.

The input unit 121a of the switching source terminal 102a receives the multiplexed stream 201 transmitted from the server 101 through a network 103 (S32). At first, the input unit 121a receives the multiplexed stream 201 including the moving image frames V1-3 and audio frames A1-3 outputted first by the server 101.

While receiving the multiplexed stream 201 from the server 101, the switching source terminal 102a by means of the controller 122a determines whether the terminal change request 207 is received from the switching destination terminal 102b or not (S34). If the terminal change request 207 has not been received (No at S34), a reproduction process is performed on the switching source terminal 102a; and if the terminal change request 207 is received (Yes at S34), a process of transferring the stream data to the switching destination terminal 102b is performed.

The case in which the terminal change request 207 has not been received (No at S34) will be described first. The controller 122a stores the multiplexed stream 201 received by the input unit 121a in the buffer 123a (S36). The controller 122a increments the loop counter i by 1, and stores the received frames in the buffer 123a as Data i. At first, the multiplexed stream 201 including the moving image frames V1-3 and audio frames A1-3 is stored in the buffer 123a as Data 1.

The switching source terminal 102a then starts to play the stream data. In the operation shown in FIG. 4, the reproduction of the stream data is started at a time point when three frames are stored in the buffer 123a. In a case where the reproduction is not started until more than three frames are stored in the buffer 123a, the switching source terminal 102a does not go into the process described below, but returns to the data reception process (S32) and waits for reception of the next moving image frame and audio frame.

The reproduction of the stream data on the switching source terminal 102a will be described. The repetition deletion unit 126a reads Data i from the buffer (S38). The repetition deletion unit 126a then demultiplexes Data i read from the buffer 123a into moving image frames and audio frames (S40). In this case, Data 1 is demultiplexed into the moving image frames V1, V2, and V3 and audio frames A1, A2, and A3 (S40). The repetition deletion unit 126a then deletes an already played moving image frame and audio frame as repeatedly received data (S42). At first, there is no already played moving image frame and audio frame, so the repetition deletion unit 126a does not delete any moving image frame and audio frame. The repetition deletion unit 126a also determines a moving image frame and audio frame read from the buffer 123a to be already-played, and stores the frame number for the read moving image frame and audio frame in the played-frame-number storage 127a (S44). In this case, each of the frame numbers for the moving image frames V1, V2, and V3 and audio frames A1, A2, and A3 is stored.

The playback means 124a then decodes and plays the frames of frame number i (S46). In this case, the moving image frame V1 and audio frame A1 of frame number 1 are decoded and played.

The controller 122a determines whether the streaming is finished or not (S52). If the streaming is determined not to be finished (No at S52), the switching source terminal 102a returns to the data reception process (S32); and if the streaming is determined to be finished (Yes at S52), the switching source terminal 102a finishes the process.

An operation to successively receive and play stream data will now be described. If the streaming is not finished, the input unit 121a receives the multiplexed stream including the moving image frame V4 and audio frame A4 (S32), and stores them in the buffer 123a as data number 2 (S36). The repetition deletion unit 126a then reads the data of data number 2 from the buffer 123a (S38), and demultiplexes it into the moving image frame V4 and audio frame A4 (S40). The repetition deletion unit 126a does not delete the moving image frame V4 and audio frame A4 since their frame number is not stored in the played-frame-number storage 127a. The repetition deletion unit 126a then stores the frame number for the moving image frame V4 and audio frame A4 in the played-frame-number storage 127a (S44). Subsequently, the playback means 124a plays the moving image frame V2 and audio frame A2 of frame number 2, which are already demultiplexed into the frames (S46). The stream data composed of the moving image frame V5 and audio frame A5 and the stream data composed of the moving image frame V6 and audio frame A6 are processed similarly to the above, where the repetition deletion unit 126a stores their frame numbers in the played-frame-number storage 127a.

The input unit 121a of the switching source terminal 102a then receives the multiplexed stream 201 composed of the moving image frames V5-7 and audio frames A5-7 (S32). The controller 122a stores the received multiplexed stream in the buffer 123a as data number 5 (S36). The repetition deletion unit 126a then reads the data of data number 5 from the buffer 123a (S38), and demultiplexes it into the moving image frames V5, V6, and V7 and audio frames A5, A6, and A7 (S40). The repetition deletion unit 126a deletes the moving image frame V5, audio frame A5, moving image frame V6, and audio frame A6 of the above frames since their frame numbers are stored in the played-frame-number storage 127a (S42). The repetition deletion unit 126a then stores the frame number for the moving image frame V7 and audio frame A7 in the played-frame-number storage 127a (S44). Subsequently, the moving image frame V5 and audio frame A5 of frame number 5, which are already demultiplexed into the frames, are played (S46). In this way, the switching source terminal 102a stores the multiplexed stream transmitted from the streaming server in the buffer 123a as well as successively reads data from the buffer 123a and plays the stream data.

An operation in a case where the terminal change request 207 (see FIG. 2) is inputted from the switching destination terminal 102b to the switching source terminal 102a will be described next.

When the terminal change request 207 is inputted to the switching source terminal 102a, it determines that the terminal change request is received (Yes at S34) in the process of determining whether the terminal change request is received or not (S34).

The controller 122a calculates the frame number k for data to be outputted from the switching source terminal 102a to the switching destination terminal 102b. This frame number k is the number for the most recently played independent frame. In the embodiment, the frame number k is calculated by the following equation (S48):

$$k=[i/n] \times n+1 \qquad (1)$$

In the above equation, [ ] denotes the floor function, which returns the largest integer not exceeding the value of its argument. For example, if frames up to frame number 5 have been played, then i=5 and n=4; and therefore k=[5/4]×4+1=5.

The switching output unit 125a then outputs Data k to the switching destination terminal 102b (S50). Data k is an independent frame and, in the embodiment, includes a moving image frame and audio frame of frame number k as well as moving image frames and audio frames of frame numbers k+1 through k+b. Now k=5, and therefore Data 5 is outputted to the switching destination terminal 102b. Since b=2 in this case, Data 5 includes frames of frame number 5 as well as frames of frame numbers 6 and 7. The switching source terminal 102a thus outputs the moving image frames V5-7 and audio frames A5-7 to the switching destination terminal 102b.

After outputting the independent frame of data number k stored in the buffer 123a in response to the terminal change request 207, the switching source terminal 102a transfers data transmitted from the streaming server 101 to the switching destination terminal 102b. On completion of handling the terminal change request 207, the switching source terminal 102a stops the data reproduction since the terminal to play the stream data is switched to the switching destination terminal 102b.

(Operation of the Switching Destination Terminal)

Figure 5:
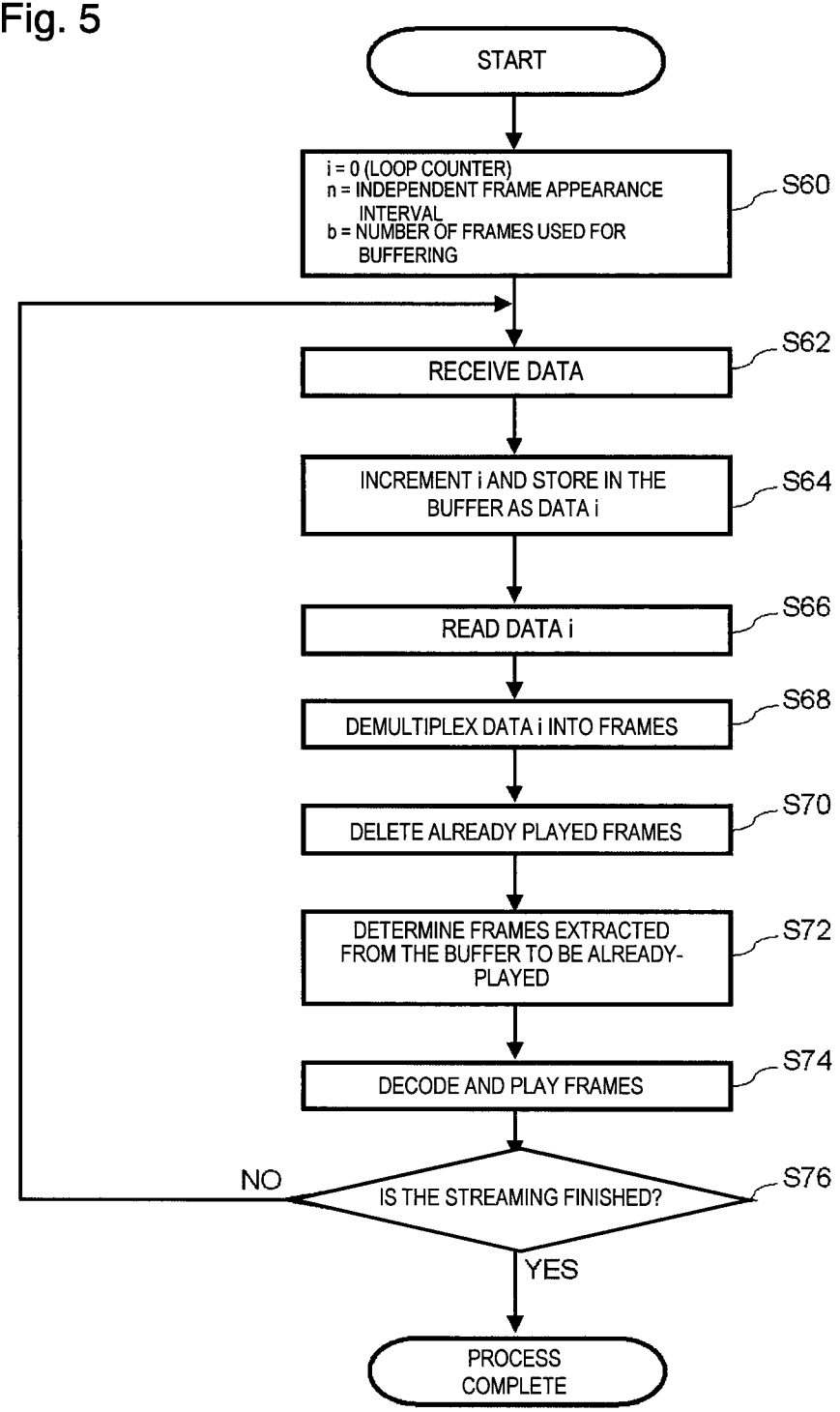
FIG. 5 is an operation flowchart of a switching destination terminal 102b of the first embodiment.

FIG. 5 shows an operation of the switching destination terminal 102b. FIG. 5 shows an operation at a time of receiving the stream after the output of the terminal change request 207 (see FIG. 2). The operation of the switching destination terminal 102b is basically the same as the operation of receiving and reproducing data of the switching source terminal 102a. Unlike the switching source terminal 102a, however, the switching destination terminal 102b receives the multiplexed stream by means of the switching input unit 125b.

First, the switching destination terminal 102b performs an initialization process (S60). A controller 122b of the switching destination terminal 102b substitutes 0 for a loop counter i that indicates the ordinal position of the multiplexed stream 204. The controller 122b sets the value of an independent frame appearance interval n based on a codec that it uses, and sets the number of frames used for buffering, b. They are set in the embodiment as n=4 and b=2.

The switching input unit 125b of the switching destination terminal 102b receives the multiplexed stream 202 transmitted from the switching source terminal 102a through a network 104 (S62). At first, the multiplexed stream including: the moving image frame V5 and audio frame A5, which are most recent independent frames played at the time of the terminal change request 207; and the moving image frames V6 and V7 and audio frames A6 and A7, which follow the independent frames, are inputted to the switching input unit 125b.

The controller 122b stores the multiplexed stream inputted to the switching input unit 125b in the buffer 123b (S64). The controller 122b increments the loop counter i by 1, and stores the received frames in the buffer 123*b* as Data i. At first, the controller 122*b* stores the multiplexed stream 202 including the moving image frames V5-7 and audio frames A5-7 in the buffer 123*b* as Data 1.

The switching destination terminal 102*b* then starts to play the stream data. As with the switching source terminal 102*a*, the switching destination terminal 102*b* starts the reproduction of the stream data at a time point when three frames are stored in the buffer 123*b*. The reproduction may be started after more than three frames are stored in the buffer 123*b*.

When the reproduction of the stream data is started, a repetition deletion unit 126*b* reads Data i from the buffer 123*b* (S66). The repetition deletion unit 126*b* then demultiplexes Data i read from the buffer 123*b* into moving image frames and audio frames (S68). In this case, Data 1 is demultiplexed into the moving image frames V5, V6, and V7 and audio frames A5, A6, and A7 (S68).

The repetition deletion unit 126*b* then determines whether the frame number for a moving image frame and audio frame read from the buffer 123*b* is stored in a played-frame-number storage 127*b* or not. If the frame number for the read moving image frame and audio frame is stored in the played-frame-number storage 127*b*, the repetition deletion unit 126*b* deletes the moving image frame and audio frame read from the buffer 123*b* (S70). At first, there is no already played moving image frame and audio frame, so no moving image frame and audio frame is deleted. The repetition deletion unit 126*b* also determines a moving image frame and audio frame read from the buffer 123*b* to be already-played, and stores the number for the frames in the played-frame-number storage 127*b* (S72). In this case, the moving image frames V5, V6, and V7 and audio frames A5, A6, and A7 are determined to be already-played.

The playback means 124*b* then decodes and plays a frame of the smallest frame number (S74). In this case, the moving image data and audio data of frame number 5 are decoded and played.

The controller 122*b* determines whether the streaming is finished or not (S76). If the streaming is determined not to be finished (No at S76), the switching destination terminal 102*b* returns to the data reception process (S62); and if the streaming is determined to be finished (Yes at S76), the switching destination terminal 102*b* finishes the process.

An operation to successively receive and play stream data will now be described. If the streaming is not finished, the switching input unit 125*b* receives the multiplexed stream including the moving image frame V8 and audio frame A8 (S62), and stores them in the buffer 123*b* as data number 2 (S64). The repetition deletion unit 126*b* then reads the data of data number 2 from the buffer 123*b* (S66), and demultiplexes it into the moving image frame V8 and audio frame A8 (S68). The repetition deletion unit 126*b* does not delete the moving image frame V8 and audio frame A8 since their frame number is not stored in the played-frame-number storage 127*b*. The repetition deletion unit 126*b* then stores the frame number for the moving image frame V8 and audio frame A8 in the played-frame-number storage 127*b* (S72). Subsequently, the playback means 124*b* plays the moving image frame V6 and audio frame A6 of frame number 6, which are already demultiplexed into the frames (S74). The multiplexed stream composed of the moving image frame V9 and audio frame A9 and the multiplexed stream composed of the moving image frame V10 and audio frame A10 are processed similarly to the above, where the repetition deletion unit 126*b* stores their frame numbers in the played-frame-number storage 127*b*.

The switching input unit 125*b* of the switching destination terminal 102*b* then receives the multiplexed stream 202 composed of the moving image frames V9-11 and audio frames A9-11 (S62). The controller 122*b* stores the received multiplexed stream in the buffer 123*b* as data number 5 (S64). The repetition deletion unit 126*b* then reads the data of data number 5 from the buffer 123*b* (S66), and demultiplexes it into the moving image frames V9, V10, and V11 and audio frames A9, A10, and A11 (S68). The repetition deletion unit 126*b* deletes the moving image frame V9, audio frame A9, moving image frame V10, and audio frame A10 of the above frames since their frame numbers are stored in the played-frame-number storage 127*b* (S70). In this manner, since the switching destination terminal 102*b* manages the numbers of already played frames by means of the played-frame-number storage 127*b* and deletes repeated frames, it will not repeatedly play one frame.

The repetition deletion unit 126*b* then stores the frame number for the moving image frame V11 and audio frame A11 in the played-frame-number storage 127*b* (S72). Subsequently, the playback means 124*b* plays the moving image frame V9 and audio frame A9 of frame number 9, which are already demultiplexed into the frames (S74). In this way, the switching destination terminal 102*b* stores the multiplexed stream transmitted from the streaming server in the buffer 123*b* as well as successively reads data from the buffer 123*b* and plays the stream data.

Up to this point, there have been described the streaming system and streaming method of the first embodiment.

The streaming system of the embodiment transmits a multiplexed stream of an independent frame with the addition of two difference frames with the transmission timing at the 1st time, and can therefore reduce the time required for initial buffering. Conventionally, the buffering would not be completed until the moving image data V3 and audio data A3 are transmitted with the transmission timing for Data 3. In the embodiment, as shown in FIG. 2, three frames of data are stored in the buffer 123*a* with the transmission timing at the 1st time, and the reproduction can thus be started immediately after the buffering of Data 1 is completed.

The streaming system of the embodiment transmits a multiplexed stream of an independent frame with the addition of two difference frames not only at the start of streaming but also at regular intervals, and stores the multiplexed stream in the buffer 123*a* of the switching source terminal 102*a*. This allows data of the multiplexed stream including three frames to be transferred when the terminal to play the stream data is switched from the switching source terminal 102*a* to the switching destination terminal 102*b*, and therefore can reduce the time required for the switching destination terminal 102*b* to buffer the data. That is, the switching source terminal 102*a* cannot predict the timing for receiving a terminal change request but, in the embodiment, a multiplexed stream of an independent frame transmitted at regular intervals is generated with the addition of difference frames used for buffering, and thus the above-described advantage of reducing the time required for buffering is provided no matter what timing the terminal change request is received with.

When switching the terminal to play stream data, the switching source terminal 102*a* outputs the multiplexed stream as-is, so the switching source terminal 102*a* need not re-encode and the time for switching can be reduced. The amount of processing in software and hardware is also reduced, and this leads to an advantage of facilitating development of both software and hardware.

The streaming server 101 of the embodiment, with transmission timing of independent frames, transmits an independent frame that should be normally transmitted with the transmission timing and thereby keeps the transmission rate of the streaming, and therefore it can support existing receive terminals. In the embodiment, a plurality of frames are transmitted with transmission timing of independent frames, and one frame is repeatedly transmitted in order to keep the streaming rate. As described above, however, the switching source terminal 102a or the switching destination terminal 102b deletes a repeated frame by means of the repetition deletion unit 126a or 126b when reproducing stream data even though one frame arrives several times. Consequently, the repeated transmission of one frame will not cause inconvenience of repeated reproduction of the same frame on the switching source terminal 102a or switching destination terminal 102b.

Second Embodiment

A streaming system of a second embodiment will now be described. The streaming system of the second embodiment is a streaming system in which only audio data is added to an independent frame as data used for buffering. The configuration of the streaming system of the second embodiment is the same as that of the first embodiment (see FIG. 1).

Figure 6:
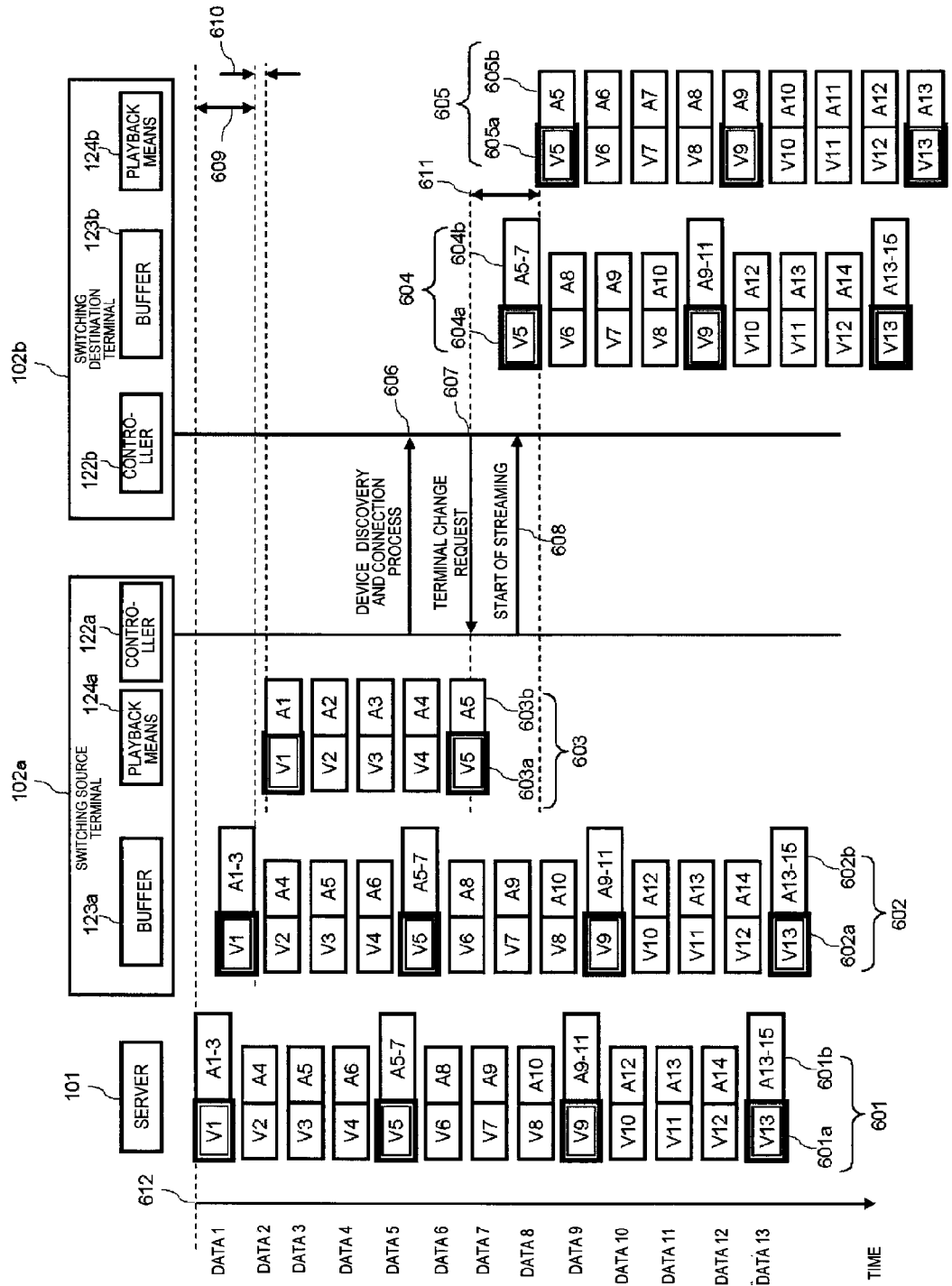
FIG. 6 is a transmission timing diagram of a second embodiment.

FIG. 6 shows transmission timing of moving image frames and audio frames in the streaming system of the second embodiment. As in the case of the first embodiment, the independent frame appearance interval for moving image frames is set as n=4, and the number of frames of audio data to be added for use in buffering is set as b=2.

An operation of the server 101 in FIG. 6 will be described. The server 101 outputs a multiplexed stream 601, in which a moving image frame and an audio frame are multiplexed, at fixed time intervals. Since the independent frame appearance interval is n, the frame number for an independent frame is expressed by (1+n×m), where m is an integer equal to or greater than zero. A frame of frame number (1+n×m) is added with b pieces of audio frames for use in buffering.

Consequently, in FIG. 6, moving image frames V1, V5, V9, and V13, which are independent frames, are multiplexed with audio frames A1-3, A5-7, A9-11, and A13-15, respectively, for the multiplexed stream 601 outputted by the server 101. That is, two audio frames are added to the moving image frames V1, V5, V9, and V13.

In the second embodiment, when the system starts operation, the server 101 outputs the multiplexed stream 601 composed of the moving image frame V1 and audio frames A1-3 (A1, A2, and A3; hereinafter the same shall apply). The process of the streaming system for the moving image frame V1 and audio frames A1-3 will be described next.

The switching source terminal 102a stores the moving image frame V1 and audio frames A1-3 in the buffer 123a. A delay time 609 for this operation is the time required for network transmission and reception and for storing the data in the buffer 123a. On completion of the process of storing the one moving image frame and three audio frames in the buffer 123a, the switching source terminal 102a performs reproduction by means of the playback means 124a. In the example shown in FIG. 6, the display is started at a time point when the three frames (A1-3) of audio data are stored. This delay time 610 is a delay time for display on the switching source terminal 102a.

Then, with the output timing at the 2nd time following the moving image frame V1 and audio frames A1-3, the server 101 multiplexes the moving image frame V2 and the audio frame A4 to generate and output the multiplexed stream 601. The switching source terminal 102a, after finishing the process of storing the one moving image frame V2 and audio frame A4 in the buffer 123a, performs reproduction by means of the playback means 124a. In this case, the moving image frame V2 and audio frame A2 are played, since moving image data 603a and audio data 603b outputted from the buffer 123a are frames following the frames played the previous time.

The server 101 outputs the multiplexed stream 601 composed of the moving image frame V3 and audio frame A5 with the output timing at the 3rd time, and outputs the multiplexed stream 601 composed of the moving image frame V4 and audio frame A6 with the output timing at the 4th time. In response to these actions, the switching source terminal 102a performs the same operation as in the case of the multiplexed stream 601 composed of the moving image frame V2 and audio frame A4. With the output timing at the 5th, 9th, 13th time at which the position of the multiplexed stream 601 in the order of output matches 1+n×m (m is an integer equal to or greater than zero), the switching source terminal 102a receives the moving image frame V5 and audio frames A5-7, the moving image frame V9 and audio frames A9-11, and the moving image frame V13 and audio frames A13-15, respectively.

While reproducing the multiplexed stream 603, the switching source terminal 102a performs a device discovery and connection process 606 by means of the controller 122a. The device discovery and connection process 606 is a process in which the switching source terminal 102a detects the switching destination terminal 102b and establishes communication connection therewith. The execution of the device discovery and connection process 606 allows the switching source terminal 102a and the switching destination terminal 102b to communicate with each other. The device discovery and connection process 606 may be activated by a user operation, a timer, or other triggers.

On detection of the switching destination terminal 102b by the device discovery and connection process 606, the switching destination terminal 102b outputs a terminal change request 607 for switching the terminal that plays the multiplexed stream 601. In response to the terminal change request 607, the switching source terminal 102a outputs a multiplexed stream 602 including an independent frame required for reproduction to the switching destination terminal 102b. In the example shown in FIG. 6, the moving image frame V5 and the audio frame A5 are being played when the terminal change request 607 is inputted to the switching source terminal 102a, and therefore the switching source terminal 102a outputs the multiplexed stream 602 composed of the moving image frame V5 and audio frames A5-7 to the switching destination terminal 102b.

The multiplexed stream 602 composed of the moving image frame V5 and audio frames A5-7 is inputted to the switching destination terminal 102b. On receiving the multiplexed stream 602 composed of the moving image frame V5 and audio frames A5-7, the switching destination terminal 102b immediately completes the buffering preceding the start of data reproduction. The switching destination terminal 102b, by means of the playback means 124b, demultiplexes the multiplexed stream 602 into the moving image data and audio data, then decodes them, and starts reproduction. The time required from the terminal change request 607 to the start of display is a time 611.

Operations of the server 101, switching source terminal 102a, and switching destination terminal 102b will now be described in detail with reference to FIGS. 7 to 9. The operations described below are only examples for transmitting and reproducing moving image data and audio data with the timing shown in FIG. 6. The invention is not limited to the operations described below.

(Operation of the Server)

Figure 7:
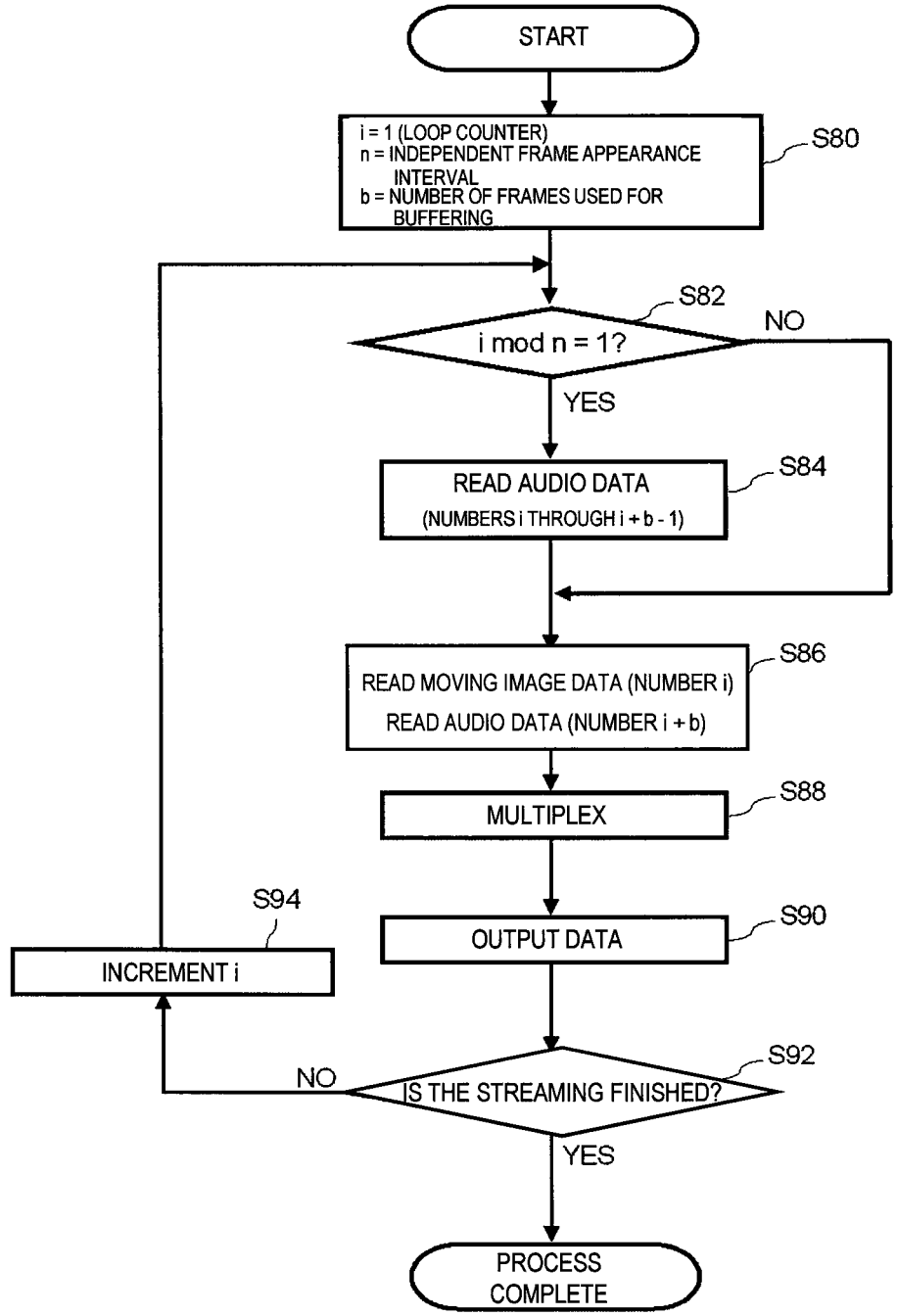
FIG. 7 is an operation flowchart of the server 101 of the second embodiment.

FIG. 7 shows an operation of the server 101 of the second embodiment. The operation of the server 101 of the second embodiment is basically the same as that of the server 101 of the first embodiment except that, if the frame to be transmitted next is an independent frame, audio data is added to the independent frame for use in buffering. That is, if the frame number is 1+n×m (m is an integer equal to or greater than zero), the transmission data generator 116 reads audio frames of frame numbers i through i+b−1 for use in buffering. For example, the transmission data generator 116 reads the audio frames A1 and A2 for the 1st independent frame (frame number 1) (S84). If the frame to be transmitted next is not an independent frame (No at S82), or if the server 101 is in the process following the process (S84) of reading audio frames to be added to an independent frame, the transmission data generator 116 reads a moving image frame of frame number i and an audio frame of frame number i+b (S86). The multiplexer 113 of the server 101 multiplexes the moving image frame and audio frame(s) read as above (S88), and the server 101 transmits it from the output unit 114 (S90).

(Operations of the Switching Source Terminal and Switching Destination Terminal)

Figure 8:
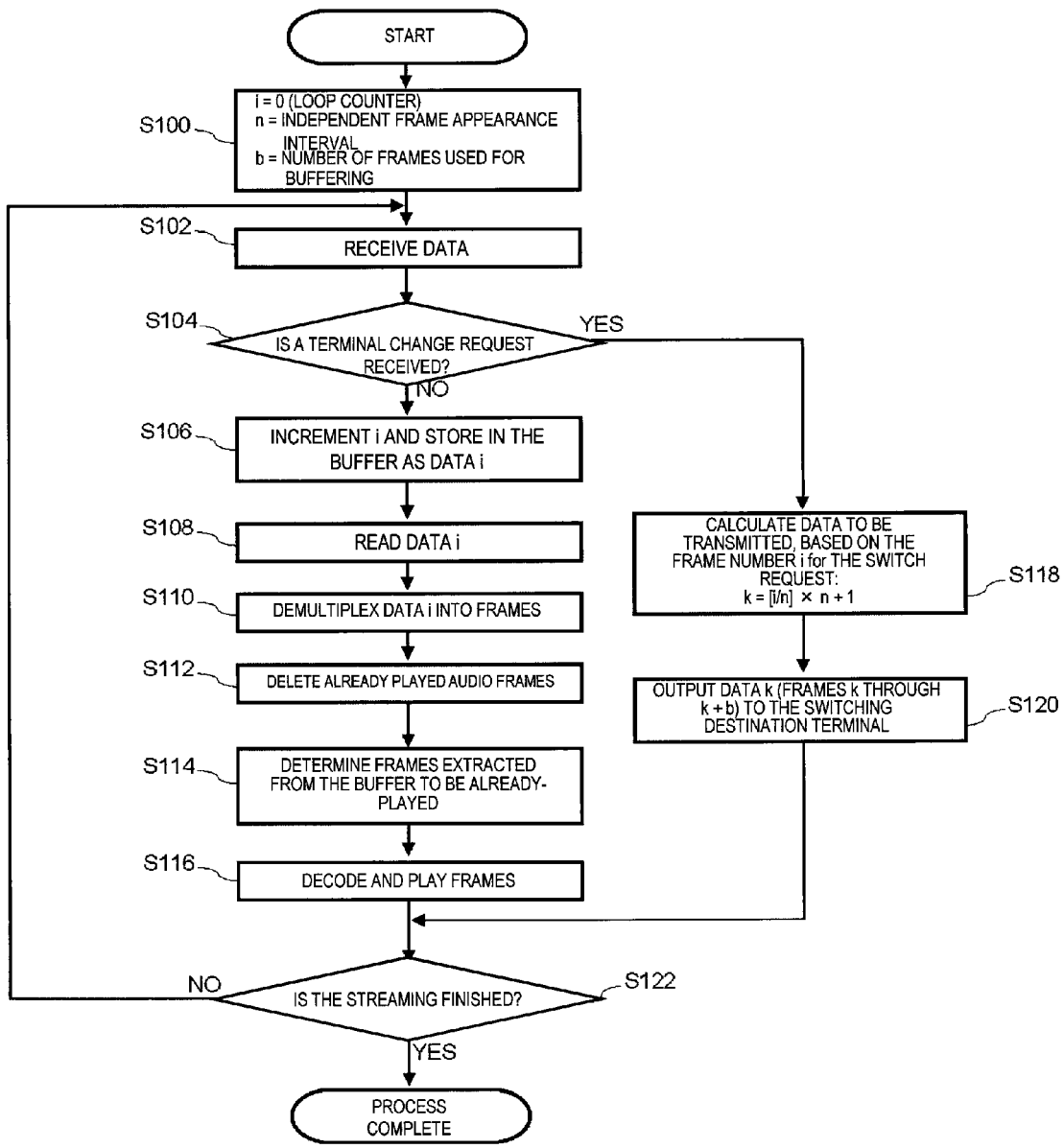
FIG. 8 is an operation flowchart of the switching source terminal 102a of the second embodiment.
Figure 9:
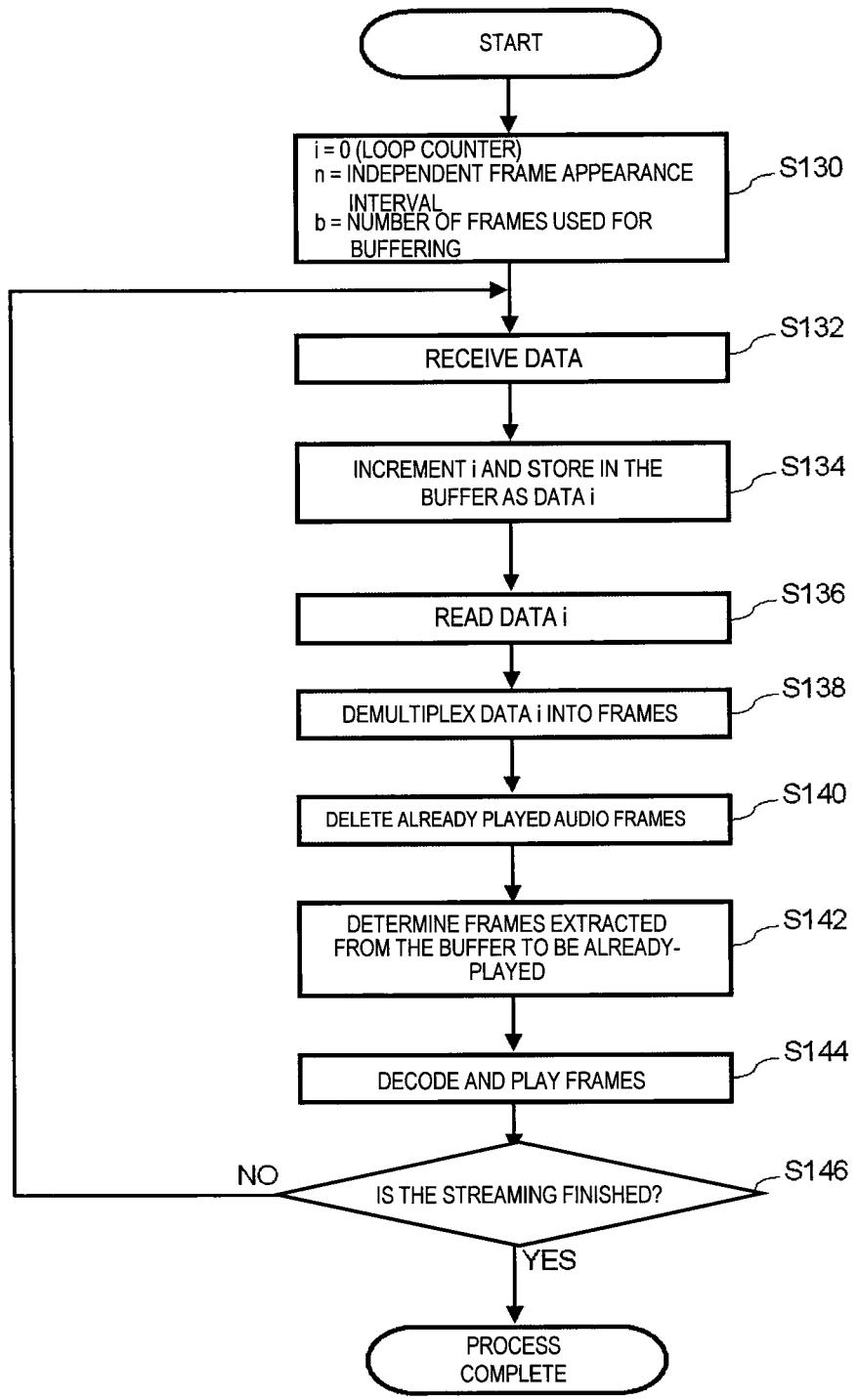
FIG. 9 is an operation flowchart of the switching destination terminal 102b of the second embodiment.

FIG. 8 shows an operation of the switching source terminal 102a of the second embodiment, and FIG. 9 shows an operation of the switching destination terminal 102b of the second embodiment. The operations of the switching source terminal 102a and switching destination terminal 102b of the second embodiment are basically the same as those of the switching source terminal 102a and switching destination terminal 102b of the first embodiment. The difference with the first embodiment is that, since the server 101 adds only audio data with transmission timing of independent frames, there is no repeated moving image frame in the multiplexed stream 601 inputted to the switching source terminal 102a or switching destination terminal 102b. The embodiment is therefore different in that the repetition deletion unit 126a does not perform the process of deleting repeated moving image data.

Since the streaming system of the second embodiment adds two audio frames to an independent frame as audio frames used for buffering, it can reduce the time required for buffering audio frames. In addition, when the reproducing terminal is to be switched, the buffering time in the switching destination terminal 102b can be reduced by transferring an audio frame with the addition of audio frames, so that the terminal can be switched quickly.

Since the streaming system of the second embodiment adopts the configuration in which only audio frames are added, it can be applied to a case where the network 103 between the server 101 and the switching source terminal 102a is narrowband. Humans are more sensitive to audio interruption and noise than to noise and loss of frames in a moving image. For this reason, in a case where the bandwidth between the server 101 and the terminal is limited, it is advantageous to buffer only audio as with the embodiment and prevent reduction in audio quality. The prevention of audio interruption allows a user to be provided with a comfortable viewing experience.

In the streaming system of the second embodiment, the switching source terminal 102a need not decode the multiplexed stream 601 nor re-encode it at the time of output, as with the first embodiment. The amount of processing in software and hardware is also reduced, and this leads to an advantage of facilitating development of both software and hardware.

While the streaming system of the invention has been described in detail with embodiments, the invention is not limited to the above-described embodiments.

An example has been described in the above-described embodiments where moving image frames and audio frames are added for use in buffering to all moving-image independent frames (key frames) to generate a multiplexed stream, but moving image frames and audio frames used for buffering do not necessarily require to be added to all independent frames. A configuration may be adopted in which moving image data or audio data is added for use in buffering to some independent frames (key frames).

In the above-described embodiments, the switching source terminal 102a may be added with a function to detect the magnitude of jitter and a function to calculate based on jitter the number of difference frames to be added to an independent frame and notify the server 101. In association with this, the server 101 may be added with a function to increase or decrease the number of frames used for buffering in accordance with the number of frames specified by the switching source terminal 102a. This configuration can achieve optimum streaming control in response to changes in the status of communications between the server and the terminal. For example, increasing the number of buffers can prevent an interruption in the stream when the jitter is large, and decreasing the number of frames used for buffering can save the bandwidth to be used when the jitter is small.

In the above-described embodiments, a terminal may be used into which the functions of the switching source terminal 102a and the switching destination terminal 102b are combined. This realizes two-way terminal switching.

In the above-described embodiments, the server may add a timestamp to a frame before multiplexing it, and the switching source terminal 102a may determine a repeated frame using the timestamp. If a timestamp is used, the switching source terminal 102a can play a moving image and audio with timing specified by the server even when a packet loss occurs on a route between the server 101 and the switching source terminal 102a.

While there has been described in the above-described embodiments a procedure in which the server 101 adds data for use in buffering to a multiplexed stream, the switching source terminal 102a can perform the same process. In the first embodiment for example, the switching source terminal 102a adds moving image frames and audio frames of frame numbers i+1 through i+b for use in buffering to an independent frame i, and stores them in the buffer 123a as Data i. The switching source terminal 102a stores, in the buffer 123a as a multiplexed stream, data whose frame number is a number increased by b with respect to the ordinal position of the multiplexed stream until the next independent frame of frame number i+n, in a manner such as: storing data of frame number i+b+1 as Data i+1; and storing data of frame number i+b+2 as Data i+2. The switching source terminal 102a then starts streaming with Data i including the most recent independent frame in response to a terminal change request from the switching destination terminal 102b, thereby providing an advantage of reduction in switching time.

While there have been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

As stated above, the streaming system of the invention has an advantage of being able to reduce the time required for buffering in streaming and is useful, for example, as a system that can switch a terminal to play stream data from a receiving terminal to another terminal, and the like.

The invention claimed is:

1. A streaming server for streaming data coded by inter-frame prediction, the streaming server comprising:
    a buffering-key-frame generator for generating transmission data including an independently decodable key frame and at least one difference frame following the key frame, and for generating a buffering key frame added with information on the transmission data, the information including a frame number; and a frame transmitter for transmitting, with first transmission timing, a first buffering key frame generated with a key frame previously transmitted in stream data and at least one difference frame also previously transmitted in the stream data and following the key frame, such that the key frame and the at least one difference frame are retransmitted within the stream data in the first buffering key frame, and for transmitting, during the interval between the first transmission timing and a second transmission timing, at least one difference frame following the difference frame used in generating the first buffering key frame, and wherein the first transmission timing and the second transmission timing are continuous timings among predetermined periodical timings.

2. The streaming server according to claim 1, wherein the streaming server transmits the stream data to a terminal, the terminal comprising:
    a frame receiver for receiving the first buffering key frame and the at least one difference frame following the first buffering key frame transmitted from the streaming server;
    a buffer for storing a frame received by the frame receiver;
    a playback means for reading a frame stored in the buffer and reproducing the stream data;
    a deletion unit including a played-frame-number storage for storing a frame number for an already played frame; and
    wherein, if a frame number for a retransmitted frame in the first buffering key frame that is read from the buffer matches a frame number stored in the played-frame-number storage, the deletion unit deletes the retransmitted frame without reproducing the frame.

3. The streaming server according to claim 2, wherein the terminal includes a switch request receiver for receiving a switch request for switching a terminal that plays stream data to another terminal, wherein when the switch request is received, a controller reads, from data stored in the buffer, data stored in the buffer headed by a buffering key frame played immediately before the reception of the switch request, and transmits the read data to the other terminal, thereby streaming to the other terminal the stream data received from the streaming server while simultaneously receiving the stream data from the streaming server.

4. A streaming server for streaming data including moving image data and audio data coded by inter-frame prediction, the streaming server comprising:
    a buffering-key-frame generator for generating transmission data including an independently decodable key frame of moving image data, an audio frame corresponding to the key frame and at least one audio frame following the audio frame, and for generating a buffering key frame added with information on the transmission data, the information including a frame number; and a frame transmitter for transmitting, with first transmission timing, a first buffering key frame generated with a first key frame, a first audio frame corresponding to the first key frame and previously transmitted in stream data and a second audio frame also previously transmitted in the stream data and following the first audio frame such that the first and second audio frames are retransmitted within the stream data in the first buffering key frame, and for transmitting, during the interval between the first transmission timing and a second transmission timing, an arbitrary difference frame following the second audio frame used in generating the first buffering key frame, and wherein the first transmission timing and the second transmission timing are continuous timings among predetermined periodical timings.

5. A streaming system comprising: a streaming server for streaming data coded by inter-frame prediction; a first terminal for reproducing stream data transmitted from the streaming server; and a second terminal for receiving stream data transferred from the first terminal and reproducing the stream data,
    wherein the streaming server comprises:
        a buffering-key-frame generator for generating transmission data including an independently decodable key frame, at least one difference frame following the key frame, and for generating a buffering key frame added with information on the transmission data, the information including a frame number; and
        a frame transmitter for transmitting, with first transmission timing, a first buffering key frame generated with a key frame previously transmitted in the stream data and at least one difference frame also previously transmitted in the stream data and following the key frame, such that the key frame and the at least one difference frame are retransmitted to the first terminal in the stream data in the first buffering key frame, and for transmitting, during the interval of the transmission timing between the first transmission timing and a second transmission timing, at least one difference frame following the difference frame used in generating the first buffering key frame, and wherein the first transmission timing and the second transmission timing are continuous timings among predetermined periodical timings,
    wherein the first terminal comprises:
        a frame receiver for receiving the first buffering key frame and the at least one difference frame following the first buffering key frame transmitted from the streaming server;
        a buffer for storing a received frame;
        a playback means for reading a frame stored in the buffer and reproducing the stream data;
        a deletion unit including a played-frame-number storage for storing a frame number for an already played frame; and
        wherein, if a frame number for a retransmitted frame in the first buffering key frame that is read from the buffer matches a frame number stored in the played-frame-number storage, the deletion unit deletes the retransmitted frame without reproducing the frame, and
        wherein when a switch request is received, the first terminal reads, from data stored in the buffer, data stored in the buffer headed by a buffering key frame played immediately before the reception of the switch request, and transmits the read data to the second terminal, thereby streaming to the second terminal the stream data received from the streaming server while simultaneously receiving the stream data from the streaming server.

6. A streaming method comprising the steps of:

streaming, by a streaming server, data coded by inter-frame prediction, generating transmission data including an independently decodable key frame and at least one difference frame following the key frame, and generating a buffering key frame added with information on the transmission data, the information including a frame number;

transmitting, with first transmission timing, a first buffering key frame generated with a key frame previously transmitted in stream data and at least one difference frame also previously transmitted in the stream data and following the key frame, such that the key frame and the at least one difference frame are retransmitted within the stream data in the first buffering key frame; and transmitting, during the interval of the transmission timing between the first transmission timing and a second transmission timing, at least one difference frame following the difference frame used in generating the first buffering key frame, and wherein the first transmission timing and the second transmission timing are continuous timings among predetermined periodical timings.

7. The streaming method according to claim 6, further comprising the steps of:

the streaming server receiving data on the number of difference frames included in the first buffering key frame, the data calculated based on jitter by a terminal that receives stream data, from the terminal; and increasing or decreasing the number of difference frames to be included in a buffering key frame based on the data on the number of frames.

8. The streaming method according to claim 6, further comprising the steps of:

receiving the first buffering key frame and the at least one difference frame following the first buffering key frame transmitted from the streaming server;

storing the received first buffering key frame and the at least one difference frame following the first buffering key frame in a buffer;

reading a frame stored in the buffer and reproducing the stream data;

storing a frame number for an already played frame in a played-frame-number storage; and if a frame number for a retransmitted frame in the first buffering key frame that is read from the buffer matches a frame number stored in the played-frame-number storage, deleting the retransmitted frame without reproducing the frame.

9. The streaming method according to claim 8, further comprising the steps of:

receiving a switch request for switching a terminal that plays stream data to another terminal; and when the switch request is received, reading, from data stored in the buffer, data stored in the buffer headed by a buffering key frame played immediately before the reception of the switch request, and transmitting the read data to the other terminal, thereby streaming to the other terminal the stream data received from the streaming server while simultaneously receiving the stream data from the streaming server.

10. The streaming method according to claim 8, further comprising the steps of:

detecting the magnitude of jitter in data transmitted from the streaming server;

calculating based on the jitter the number of difference frames to be added to the first buffering key frame; and transmitting data on the number of the difference frames to the streaming server.

* * * * *